Sept. 13, 1966

B. P. CHIRON 3,273,082

TEMPERATURE COMPENSATED RECIPROCAL
FERRITE PHASE SHIFTER

Filed Dec. 11, 1963

Inventor
Bernard Pierre Chiron

By Karl W. Flocks
  Attorney

Sept. 13, 1966  B. P. CHIRON  3,273,082
TEMPERATURE COMPENSATED RECIPROCAL
FERRITE PHASE SHIFTER
Filed Dec. 11, 1963  3 Sheets-Sheet 3

TEMPERATURE SENSITIVE COMPENSATING FERRITE

CONDUCTIVE WAVE GUIDE

United States Patent Office 3,273,082
Patented Sept. 13, 1966

3,273,082
TEMPERATURE COMPENSATED RECIPROCAL
FERRITE PHASE SHIFTER
Bernard Pierre Chiron, Kremlin-Bicetre, France, assignor to Lignes Telegraphiques et Telephoniques, Paris, France, a joint-stock company
Filed Dec. 11, 1963, Ser. No. 329,921
Claims priority, application France, Dec. 12, 1962, 918,341
6 Claims. (Cl. 333—31)

The present invention relates to ferrite reciprocal phase shifter for ultra-high-frequency electromagnetic waves, in which variation in phase shift is controlled by varying the strength of a continuous magnetic field superimposed on the field generated by said waves and applied parallel to the direction of propagation of such waves.

Phase shifters of this type are already known, for instance those going under the name of Reggia-Spencer phase shifters which are constituted by a portion of rectangular-section waveguide in which a ferrite rod is disposed along the axis of the waveguide; the superimposed magnetic field is produced by a D.C. current passing through a coil wound around the waveguide.

But a phase shifter must be usable at temperatures ranging from —40° C. to +70° C. However, it has been noted that the permeability of ferrite varies in general with the temperature to which it is subjected, and that, consequently, the phase shift also varies with the temperature for a given value of D.C. current intensity.

The object of the present invention is to overcome this drawback by compensating for the variation in phase shift due to variation in temperature by varying the phase shift obtained, and this by varying the intensity of the superimposed magnetic field without changing the value of the D.C. current intensity, this variation of the magnetic field strength being effected by placing elements of ferrite whose permeability varies greatly with temperature between the waveguide and the coil through which flows the current responsible for said superimposed magnetic field.

The variable phase shifting reciprocal phase shifter which can be used at ultra-high-frequencies, in accordance with the invention, comprises a portion of waveguide within which is placed at least one element made of a ferromagnetic material having gyromagnetic properties and which can be used at ultra-high-frequencies, and a coil wound around the waveguide through which passes a D.C. current providing the element or elements of ferromagnetic material with a magnetic field which is parallel to the direction of propagation of the ultra-high-frequency electromagnetic waves, which current can be made to vary in intensity, hence varying the intensity of the magnetic field, in order to vary the phase shifting or the phase shifter; the said phase shifter comprises, moreover, one or more tubular ferrite cores whose permeability varies greatly with temperature and which is or are disposed between the waveguide and the coil wound around the latter; this ferrite will hereafter be designated as the "field compensation" ferrite.

In a first embodiment, the coil is wound around that part of the waveguide containing the ultra-high-frequency ferromagnetic element or elements; a "field compensation" tubular ferrite core is placed between this part of the waveguide and the coil. Should the permeability of the "field compensation" ferrite fall with rise in temperature, then the magnetic field applied to the ultra-high-frequency ferromagnetic material grows in strength, and should the permeability of the ferrite rise with rise in temperature, then the strength of the magnetic field decreases.

In a second embodiment, the coil comprises two portions joined together and which are wound around the waveguide on either side of the central part thereof which contains the ultra-high-frequency ferromagnetic element or elements; a "field compensation" tubular ferrite core is placed between the waveguide and each of the portions of the coil. In this case, should the permeability of the "field compensation" ferrite fall with rise in temperature, then the strength of the magnetic field applied to the ultra-high-frequency ferromagnetic material decreases, but if the permeability rises with rise in temperature then the magnetic field strength grows.

Another feature of the invention comprises placing a small magnet above each of the ferrite cores which are highly sensitive to variation in temperature, between the latter and the coil, in order to produce a fixed bias for compensating the variation in phase shifting due to variation in temperature when the D.C. current intensity is nil.

It is also possible to place the said magnetic or magnets between the waveguide and the "field compensation" ferrite core or cores, but their influence would probably not be as great.

In certain cases use is made of ferrite magnets whose own variation in characteristics as a function of temperature may be useful.

The present invention is described in greater detail in connection with the following forms of embodiment given by way of non-limiting examples and illustrated by the accompanying drawings, in which.

The method of compensation for variation in phase shift, due to variation in temperature, according to the invention, is based on the fact that, if a core forming a closed circuit and made of ferrite whose permeability varies with temperature be placed within a coil through which flows a D.C. current, then the strength of the magnetic field within the structure thus formed varies with change in temperature for a given value of D.C. current intensity. Should the permeability of the ferrite fall when the temperature rises, then the magnetic field grows in strength.

This property is theoretically explainable since, once the ferrite is present, there is generated a demagnetizing field which decreases in strength as the permeability of the ferrite decreases, and which opposes the longitudinal field created by the current in the coil, this field being of constant strength in the absence of ferrite; consequently, the strength of the resulting magnetic field within the structure grows; therefore, if the permeability of the ferrite falls with rise in temperature then the strength of the magnetic field within the structure grows. In the same manner it could be demonstrated that if the permeability of the ferrite increases with rise in temperature then the magnetic field within the structure diminishes in strength.

Figure 1:
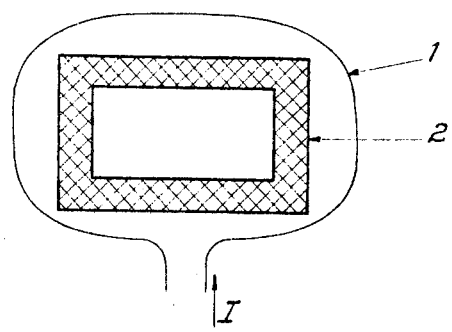
FIGURE 1 illustrates a cross-section of a special structure used for explaining the invention.

This property has been verified experimentally. To do so, use was made of a special structure as shown diagrammatically in cross-section in FIGURE 1. This structure is constituted by a coil 1 within which there is a hollow nickel-zinc ferrite core whose section is of the rectangular shape indicated by 2. The dimensions of the central space are 25.4 mm. by 12.6 mm. and the thickness of the core wall is 6.5 mm. In this specific example the ferrite selected was a nickel-zinc ferrite whose permeability decreases with rise in temperature.

Figure 2:
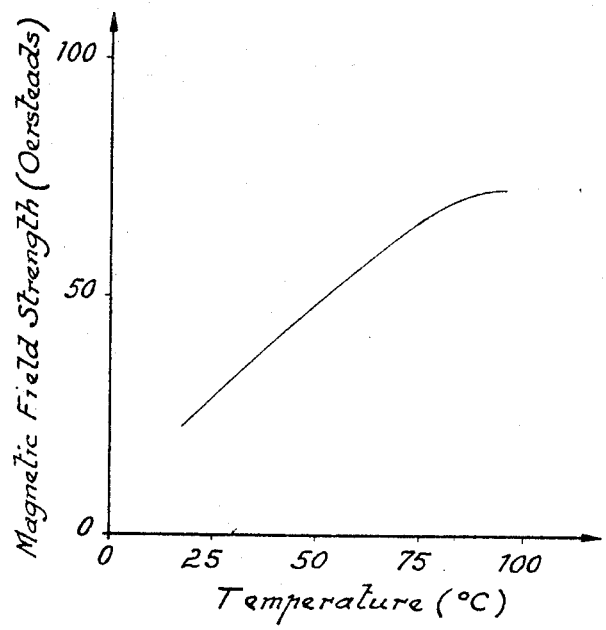
FIGURE 2 is a graph showing variation in magnetic field within the structure of FIGURE 1 as a function of temperature.

FIGURE 2 illustrates the variation in magnetic field intensity, evaluated in oersteds, within the above structure as a function of the temperature, in ° C., for a given value of D.C. current intensity within the coil 1. The graph shows that such a variation of field strength with temperature is extremely high, of the order of 50 oersteds for a rise in temperature of 60° C.

Figure 3:
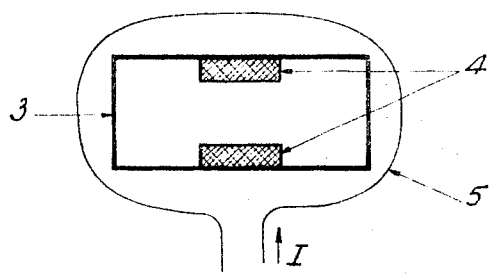
FIGURE 3 is a diagrammatic cross-section of a phase shifter of the "flat structure" type.

The method of compensation according to the invention, based on the property explained above, is hereafter described with reference to a flat structure phase shifter by way of example. Such a phase shifter is diagrammatically illustrated in FIGURE 3. It comprises a metallic-walled waveguide of rectangular section 3, two ultra-high-frequency ferrite plates 4, for instance of rectangular section, applied respectively against each of the larger sides of the wave guide section and symmetrically with respect to the plane of symmetry parallel to the shorter sides, and a coil 5 which is wound around the waveguide and through which flows a D.C. current, I. The phase shift was measured at a frequency of 3,000 mc./s. on a phase shifter of this type which was 264 mm. long, and whose waveguide measured 66.37 mm. by 29.5 mm. in cross-section. The ultra-high-frequency manganese-magnesium-titanium ferrite plates had a section of 30 mm. by 8 mm.

Figure 4:
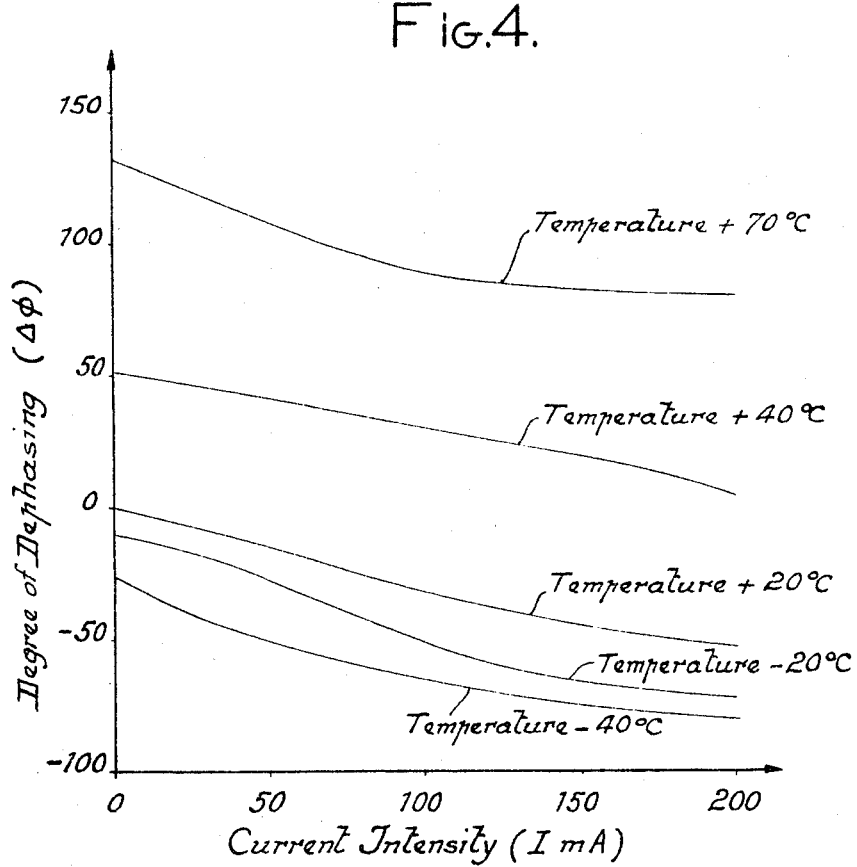
FIGURE 4 is a graph showing curves of variation in phases shift for a phase shifter of the type shown in FIGURE 3 as a function of intensity of D.C. current in the coil wound around the waveguide, at different temperatures.

FIGURE 4 gives curves showing the variation in phase shift measured as a function of the current intensity I with constant temperature, the currents varying from 0 to 200 ma. for temperatures of from −40° C. to +70° C. The phase shift $\Delta\phi$ is expressed in degrees, and the current I in milliamperes.

These curves show that the variations in phase shift with variations in temperature, without compensation, are very large. For a given value of current intensity I, the phase shifting of the phase shifter increases when the temperature rises. On the other hand the curves show that, at a given temperature, the phase shifting decreases when the current I increases; the phase shifting accordingly decreases when the superimposed field grows in strength. As a result, should the field applied to the ultra-high-frequency ferrite grow in strength with rise in temperature it is possible to compensate the applied field in such a way that the phase shift of the phase shifter remains substantially constant whatever be the temperature, within fixed limits.

Figure 5:
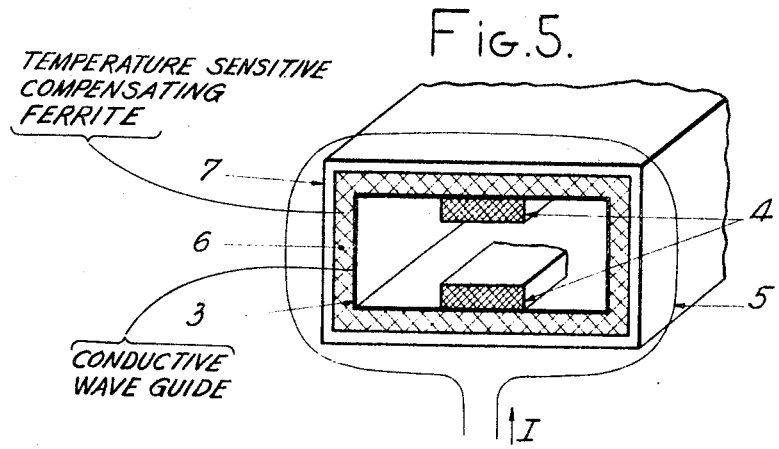
FIGURE 5 shows the phase shifter of FIGURE 3 provided with the improvements according to the present invention.

In order to vary the strength of the superimposed field, for a constant value of current intensity I, use is made, according to the invention, of the property previously disclosed by placing, as shown in FIGURE 5, a core 6 formed of four plates, for instance, of a ferrite of large permeability variation with variation in temperature between the waveguide 3 and the coil 5. The field compensation ferrite selected for the core 6 is a ferrite whose permeability decreases as the temperature rises, for instance the nickel-zinc ferrite used in establishing the curves in FIGURE 2; as a consequence, by virtue of the property explained at the beginning of this description, the superimposed field applied within the waveguide grows in strength and thereby tends to cause the phase shifting of the phase shifter to decrease, which produces a compensation of the increase in phase shifting with rise in temperature resulting from the increase in the permeability of the ultra-high-frequency ferrite with the increase in temperature.

The ferrite of the "field compensation" core 6 must have a large variation in permeability with variation in temperature, but it need not necessarily have good ultra-high-frequency characteristics. The dimensions of the ferrite core 6 are determined so as to obtain the desired variation in field strength with variation in temperature in order to achieve the compensation sought.

Around the "field compensation" ferrite and beneath the coil there is placed a small magnet 7, constructed for instance in plate form, and which creates a fixed bias, so that even without control current the variation in phase shift with variation in temperature is compensated.

Figure 6:
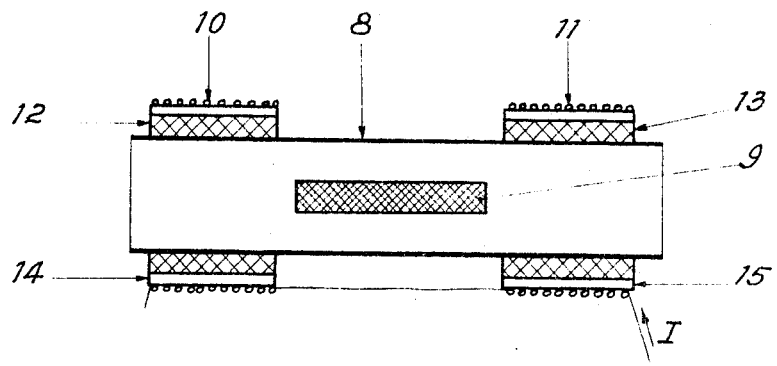
FIGURE 6 is a diagrammatic cross-section of a phase shifter according to the second embodiment of the invention.

FIGURE 6 illustrates diagrammatically a longitudinal section of a phase shifter according to the second embodiment of the invention. It comprises a waveguide represented by 8 with, for example, one ultra-high-frequency ferrite element 9 disposed along the axis of the waveguide towards the middle of the latter in the longitudinal direction. Wound around the waveguide is a coil formed of two similar portions 10 and 11 joined together so that the field created thereby is in the same direction; these portions 10 and 11 are wound on either side of the central part of the waveguide wherein lies the ferrite element 9. Between the waveguide 8 and each of the portions of coil 10 and 11 there is a ferrite core 12 or 13 of large variation in permeability with variation in temperature, and above the latter there is a magnet 14 or 15.

Measurements made on a phase shifter of such a structure have shown that without compensation the phase shifting of the phase shifter increases for a rise in temperature at a fixed current intensity and that the phase shifting increases with increase of current intensity I at fixed temperature. It would be possible to compensate for variation in phase shift with variation in temperature by employing in the device of FIGURE 5 a single "field compensation" ferrite disposed around that portion of the waveguide which contains the ultra-high-frequency ferrite 9, but it would be necessary to use as "field compensation" ferrite a ferrite whose permeability increases with rise in temperature. If it should be desired to use a ferrite whose permeability decreases with rise in temperature, such as that used in the experiments described above, then the device of FIGURE 6 should be employed. Indeed, with this device the intensity of the superimposed magnetic field grows in the portions of the waveguide on which are wound the portions 10 and 11 of the coil, and falls in the central part of the waveguide containing the ultra-high-frequency ferrite 9, when the temperature rises. The reduction of this field strength causes a decrease in phase shifting and since, in the absence of compensation, the phase shifting increases with rise in temperature, this results in a compensation of the variation in phase shift of the phase shifter with variation in temperature.

The invention must not be considered limited to the specific examples described, as it is applicable to phase shifter having waveguides and ferrite elements of shapes and sizes other than those given in the examples, and also to phase shifters in which are used ultra-high-frequency ferrites and "field compensation" ferrites differing from those indicated but having the desired qualities.

The method of compensating the phase shift is not limited to phase shifters whose directions of variation of phase shifting as a function of the temperature and as a function of the current intensity I are the same as those indicated in the examples, since compensation according to the invention is possible for every case within a certain temperature range and current range by selecting the appropriate embodiment and appropriate dimensions for the cores as well as the appropriate type of "field compensation" ferrite.

I claim:

1. Variable phase shifting phase shifter for ultra-high-frequency electromagnetic waves, including a portion of waveguide within which is located at least one element of ferromagnetic material for ultra-high-frequencies and having gyromagnetic properties such as ferrite, a coil wound around said waveguide through which is adapted to pass a D.C. current which can be made to vary in intensity to vary the phase shift of the phase shifter, and at least one tubular ferrite core, called "field compensation" ferrite core, of large variation in permeability with variation in temperature located between said waveguide and said coil wound around said waveguide, the dimensions of said ferrite core or cores and the type of ferrite being selected such that the variation in phase shift with variation in temperature is approximately compensated over a large temperature range.

2. Phase shifter according to claim 1, wherein said coil is wound around the portion of waveguide within which there is at least one element of ultra-high-frequency ferromagnetic material, said tubular ferrite core, called "field compensation" ferrite core, being located between said coil and said portion of said waveguide around that portion of said waveguide containing said at least one element of ferromagnetic material.

3. Phase shifter according to claim 1, wherein said coil is formed of two similar portions joined together so that the magnetic fields created are of the same direction, each portion being wound around a portion of said waveguide situated at either side of the central portion within which is the ultra-high-frequency ferromagnetic material, said tubular ferrite core, called "field compensation" ferrite core, being located between said waveguide and each of said portions of said coil.

4. Phase shifter according to claim 1 wherein a magnet, which can be of ferrite, is located between each of said "field compensation" ferrite cores and the corresponding portion of said coil.

5. Phase shifter according to claim 2, wherein a magnet, which can be of ferrite, is located between each of said "field compensation" ferrite cores and the corresponding portion of said coil.

6. Phase shifter according to claim 3, wherein a magnet which can be of ferrite, is located between each of said "field compensation" ferrite cores and the corresponding portion of said coil.

References Cited by the Examiner

FOREIGN PATENTS 1,073,049   1/1960   Germany.

HERMAN KARL SAALBACH, *Primary Examiner.*

M. NUSSBAUM, *Assistant Examiner.*